Patented Dec. 25, 1945

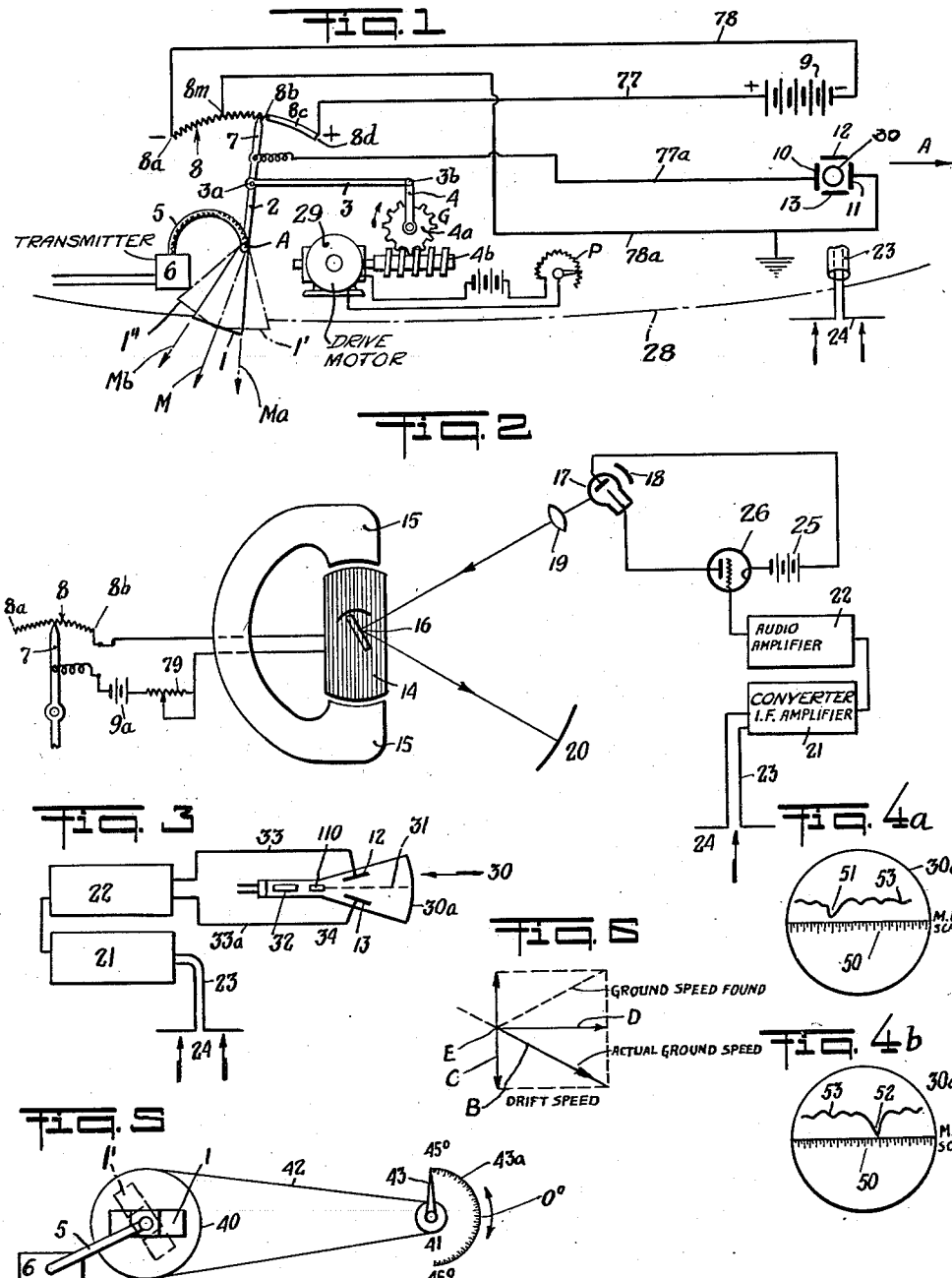

2,391,554

UNITED STATES PATENT OFFICE 2,391,554

METHOD OF AND APPARATUS FOR DETERMINING THE GROUND SPEED AND/OR COURSE OF AIRCRAFT

Lee de Forest, Los Angeles, Calif.

Application February 12, 1944, Serial No. 522,050

15 Claims. (Cl. 250—1)

My invention relates to a new and improved method of determining the ground speed of aircraft, and other data relating to the course and location of an aircraft, and to new and improved means for said purpose.

According to my invention, ground speed and the course of the aircraft can be determined, independently of visibility and weather conditions, such as head winds, side winds, etc. The drift or lateral movement of the aircraft from its predetermined course can also be determined.

According to my invention a sharply defined beam of electromagnetic energy, of suitable high and fixed carrier wave frequency, is radiated or transmitted either continuously or intermittently from the aircraft, so that said transmitted beam impinges as an incident beam upon the surface of the earth, upon successive respective areas of contact between said incident beam and said surface. Said incident beam is successively reflected from said successive areas, to be received by a receiver which is located on said aircraft. The reflected electromagnetic energy is spread by the irregular areas of contact, so that it is always picked up by the receiver. Each such successive area is designated as a transient area, since it is shifted relative to the surface of the earth. The direction of said incident beam is shifted relative to the aircraft, so as to move the transient area of contact along the surface of the earth, independently of the movement of said area which results from the movement of the aircraft. This can be done, as an example, by varying the angle of the incident beam relative to the surface of the earth. Since the surface of the earth, either solid or liquid, is ordinarily irregular, this shifting of the transient area of contact produces, in effect, a modulation of the electromagnetic energy in the reflected beam. This modulation is dependent upon the ground speed of the transient area of contact.

The shifting of the path of movement of the incident beam relative to the aircraft is regulated, so that, at predetermined and recurrent and very short intervals, said transient area of contact has a ground speed in a direction which is reverse to the course of the aircraft, and which is equal to the forward ground speed of the aircraft. Such separated intervals of time are designated as determination intervals. During each determination interval, the modulation of the reflected beam is zero, so that only the carrier frequency of the incident beam as reflected in the reflected beam, is received in the receiver of the aircraft.

By suitable means and methods which are later disclosed, the reception of the unmodulated reflected beam is used to determine the ground speed of the aircraft.

The ground speed of the transient area of contact is continuously varied, so that the reverse ground speed of said transient area of contact is equal to the forward ground speed of the aircraft, only at separated and very short and regularly recurrent intervals.

The modulation of the electro-magnetic energy of the carrier wave in the reflected beam is irregular, and such modulation is governed by the shape of the surface of the earth at each respective area of contact and by the speed at which the transient area of contact is moved relative to the surface of the earth.

The maximum frequency of the modulation is much less than the carrier frequency of the incident beam, which is identical with the carrier frequency of the reflected beam.

The receiver may be fixed to the aircraft, or it may be connected to the transmitting antenna device which is moved relative to the aircraft.

For the purpose of my invention, it is necessary to know the altitude of the aircraft. This can be determined by any suitable altimeter, or the improved device can be used as an altimeter.

I have illustrated the invention in connection with a radiating antenna device or projector which is turned successively forwardly and rearwardly relative to the aircraft, in successive oscillations. However, this is only an illustrative example, and the invention is not limited thereto. In each such complete oscillation, in the illustrative example, the transient area of contact is moved successively forwardly and rearwardly by the movement of the projector relative to the aircraft. In each rear half-oscillation, the ground speed of the transient area of contact increases from zero to a maximum and then diminishes to zero. During part of each rearward half-oscillation, the rearward ground speed of the transient area of contact exceeds the ground speed of the aircraft. This produces a series of short and recurrent intervals, only one such interval being produced during each rearward half-oscillation when the rearward movement of the area of contact is equal to the forward ground speed of the aircraft. During each such interval, the modulation is zero, or at least a minimum, because the ground speed of the area is zero, or at least a minimum. The invention is not limited to a method or apparatus in which the ground speed of the area of contact is diminished to zero.

In order to produce such recurrent intervals in which the modulation is zero, the sweep of the incident beam must be in a plane which is parallel to, or which is coincident with, the course of the aircraft.

Hence, if the aircraft is drifting or moving laterally from its predetermined course, due to a lateral wind, this drift can be detected, because the modulation can never be reduced to zero. In such case, the plane of the sweep of the incident beam is shifted, until the desired recurrent intervals of stationary area of contact and of unmodulated reflection are secured.

If the aircraft turns laterally around its longitudinal axis, thus producing a lateral sweep of the beam, perfect intervals of stationary area of contact and of unmodulated reflection cannot be secured. However, the speed of any such lateral turning movement is insignificant in comparison with the speed of ground movement of the transient area of contact which is produced by the sweep of the incident beam. Hence this factor can be disregarded for practical purposes.

The invention is not limited to any type of movement of the incident beam, relative to the aircraft. Such relative movement of the incident beam may be rotary or a straight-line movement or of any other type. If such relative movement is rotary, such relative movement of the incident beam may be oscillatory, or it may be a continuous rotary movement in the same direction.

If the sweep of the radiated and incident beam is oscillatory, the period of each half-sweep is preferably not too rapid. The minimum period of each half-sweep is preferably three to five seconds. The period of the forward half-sweep, in which the transient area of contact moves in the same direction as the aircraft, may be shorter than the period of the reverse half-sweep. The acceleration of the movement of the transient area of contact, from zero to maximum, or from maximum to zero, is preferably harmonic, but this is optional.

The angle of each half-sweep is preferably small. As an example, if the height of the aircraft above the reflecting surface is 500 feet, the angle of each half-oscillation is preferably a maximum of 20°. Hence the maximum angle of the transmitter to the vertical direction, during each half-oscillation is 10°. When the transmitter is turned from its vertical position to its maximum inclination of 10° from said vertical position, the transient area of contact will be shifted through a distance of about 88 feet. Hence the total length of ground movement of the transient area of contact, during each half-oscillation of 20°, is about 176 feet. If the altitude of the aircraft is increased relative to the reflective surface, the length of each ground sweep of the transient area of contact, and the ground speed of the transient area of contact, are proportionately increased. However, the size of the area of contact is increased with an increase in altitude, which largely neutralizes the increased modulation frequency.

It is desirable to use a very short carrier-wave.

If the respective part of the surface of the earth which reflects the incident beam is absolutely smooth, the method will not be operative. However, the surface of the earth is sufficiently irregular to produce the desired modulation, for practical purposes.

The above general statement of my invention is intended generally to explain the same, without limiting its scope. Numerous additional objects and features of my invention are stated in the annexed description and diagrammatic drawing, which illustrate preferred embodiments of my invention.

Fig. 1 illustrates the best embodiment of my invention, in which the ground speed is determined by the deflection of the electron beam of a cathode-ray tube.

Fig. 2 illustrates another embodiment of my invention, in which the modulation of the reflected beam controls the emission of light from a suitable source of light, such as a glow tube.

Fig. 3 is a detail of the receiver which is used in the embodiment of Fig. 1 and shows how the modulated energy of the reflected beam controls the up-and-down deflection of the electron stream of the cathode-ray tube.

Fig. 4a is a detail view which shows the fluorescent screen of the cathode-ray tube of the first embodiment, a scale associated with said fluorescent screen, and luminous line 53 which is traced on said screen by the electron stream. This line is of irregular vertical distance from the horizontal line of the scale 50. The low point 51 of said line 53 indicates the period in which the transient area of contact has minimum ground speed. In this case, the minimum ground speed is not zero.

Fig. 4b is similar to Fig. 4a. In Fig. 4b, the low point 52 indicates the period in which the transient area of contact has zero ground speed, or substantially zero ground speed.

Fig. 5 is a detail view of apparatus for adjusting the vertical plane in which the projector is moved, relative to the course of the aircraft, as defined by the vertical plane in which the longitudinal axis of the aircraft is located. The apparatus of Fig. 5 is used in each embodiment.

Fig. 6 is a vector diagram.

Fig. 1 shows a horn-shaped projector or radiating antenna device 1, of the familiar type which is used for radiating or projecting a beam of electro-magnetic energy, which has a carrier wave of short wave length, as for example, one-tenth of a meter. Said radiator 1 is mounted to oscillate about a point which is located on a horizontal axis A, which is the axis of a shaft which is mounted in suitable bearings. For convenience I have referred to the axis A as being horizontal although this axis is tilted from the horizontal when the aircraft itself is laterally tilted. Said radiator 1 is oscillated between the respective front and rear positions indicated by 1' and 1", so that the radiated beam is oscillated with reference to the pivot point of the radiator. As an example, the angle between said positions 1' and 1" may be 20° or less. The generator of the high-frequency carrier wave is indicated by the reference numeral 6. Said generator 6 is connected by the usual flexible coaxial cable 5 to the radiator 1, which emits a narrow-straight-line beam of electro-magnetic energy, which thus oscillates in unison with the radiator 1. The direction of the projected or radiated beam is always coincident with the longitudinal axis of radiator 1, so that, in the stated example, the radiated beam is oscillated relative to the aircraft through an angle of 20° or less. The invention is not limited to any angle of oscillation.

Arm 2 is fixed to shaft A on which radiator 1 is mounted as above described. The longitudinal axis of said arm 2 is inclined to the longitudinal axis of radiator 1. The said arm 2 is pivoted at 3a to a link 3, which link is also pivoted at 3b to the respective end of a crank-arm 4. The other end of crank-arm 4 is fixed to a shaft on which wormwheel 4a is also fixed. Wormwheel 4a meshes with the worm 4b of a drive G. The worm 4b is rotated by a motor 29. This motor 29 may be of any familiar type, which can be driven at constant and selected predetermined speed. Such speed can be adjusted, but it is constant during operation. The speed of movement of the horn 1 can be regulated so that the ground speed of the area of contact is zero or a sharply defined minimum when the horn 1 is vertical or substantially vertical, although this is not essential to the operation of my device.

The apparatus includes a potentiometer resistor 8, which is of uniform resistance between its rear end 8a and its front end 8b. Said resistor 8 has an extension segment 8c, whose resistance should be as close to zero as possible, forwardly of point 8b. Said segment 8c has a front end 8d.

The apparatus also includes a battery 9, or other source of unidirectional and constant voltage. The plus terminal of battery 9 is connected to front end 8d of segment 8c, by means of wire 77. The negative terminal of battery 9 is connected by wire 78 to the rear end 8a of resistor 8.

The cathode-ray tube 30, which has a fluorescent screen 30a, has the usual sidewise deflecting plates 10 and 11.

The cathode ray tube 30 and the lamp 17 of Figure 2, of course, belong to the general class of signal devices. They are given as examples only since I can use any type of signal device either continuous or intermittent. Furthermore, although the tube is shown as being provided with deflecting plates 10, 11 and 12, 13, these provide one type of deflecting field and I can, of course, use any other type of deflecting field or deflecting means.

When the electron beam or stream of the cathode-ray tube 30 is undeflected, its direction coincides with the median line 31 of Fig. 3. When a potential difference is impressed upon said plates 10 and 11, the electron beam will be deflected horizontally sidewise from said median line 31.

The plate 11 is connected by wire 78a to the median point 8m of the resistor 8, so that the resistance 8a—8m equals the resistance 8m—8b. This connection of plate 11 to the resistor 8 at its median point 8m is optional, because the point 8m need not be the median point of resistor 8. Point 8m may be located forwardly or rearwardly of said median point. The wire 78a is optionally connected to a point of zero potential on the aircraft.

The plate 10 is connected by wire 77a to wiper 7. This wiper 7 is made of conductive material. Said wiper 7 is fixed to and it is insulated from arm 2.

The wire 77a has a flexible helical portion adjacent wiper 7, so that the tip of wiper 7 can be moved freely to contact with resistor 8 and segment 8c, between the points 8a and 8d.

When the tip of wiper 7 contacts with point 8a, maximum negative potential is impressed upon plate 10, while plate 11 is maintained at zero potential.

When the tip of wiper 7 contacts with point 8m, both plates 10 and 11 will be at zero potential, if point 8m is the median point of resistor 8.

When the tip of wiper 7 contacts with point 8b or with any point of segment 8c, maximum positive potential is impressed upon plate 10, while plate 11 is at zero potential.

During the rearward sweep of the radiator 1, from its front position 1' to its rear position 1", the tip of the wiper 7 moves forwardly from point 8a to point 8d.

During said rearward sweep of the radiator 1, the potential of plate 10 changes from a negative maximum to a positive maximum, so that the electron beam of cathode-ray tube 30 is deflected horizontally across the entire fluorescent screen 30a. This sidewise horizontal deflection is uniform and in synchronism with the rearward sweep of the radiator 1, while the tip of the wiper moves forwardly from point 8a to point 8b. The sidewise deflection of the electron beam remains fixed while the tip of the wiper 7 moves from point 8b to point 8d.

When the arm 2 is vertical or when said arm is in the inclined position in which the tip of the wiper is between points 8m and 8b, crank-arm 4 is vertical. The link 3 may then be horizontal or it may be inclined downwardly from point 3b to point 3a. The longitudinal axis of the radiator 1 is rearwardly inclined when crank-arm 4 is vertical. The rearward angular velocity of arm 2 and of radiator 1 is then a maximum, and the rearward ground speed of the area of contact between the radiated beam and the surface of the earth, is then also a maximum.

The interval of zero modulation will occur, before the radiator 1 reaches said position of maximum rearward angular velocity. When the radiator 1 is turned rearwardly of said position of maximum angular velocity which is shown in Fig. 1, the rearward ground speed of the area of contact will diminish. There will be only a single interval of zero modulation, which will occur only during the rearward sweep of the radiator.

The purpose of the segment 8c is to maintain the luminous spot stationary on the fluorescent screen 30a, while the angular velocity of the radiator 1 is rapidly diminishing from its maximum angular velocity.

Hence the maximum reverse ground speed of the area of contact is secured when the axis of the radiator 1 is inclined rearwardly from the vertical direction.

During the forward sweep of the radiator 1, while the tip of wiper 7 is moving rearwardly from point 8d to point 8a, the forward ground speed of the area of contact is added to the forward ground speed of the aircraft, so that there is no interval of zero modulation during the forward sweep of the radiator.

The position of the longitudinal axis of the radiator 1, along which the projected beam is radiated, is indicated by M, at the time that the radiator 1 has maximum rearward angular velocity. When the radiator 1 is in its extreme forward position, the position of said longitudinal axis of radiator 1 is indicated by the line Ma. When the radiator 1 is in its extreme rearward position, the position of its longitudinal axis is indicated by the line Mb.

P represents an adjustable control rheostat for controlling the speed of motor 29, so that it can be set to operate at a selected constant speed. The resistance of rheostat P can be manually regulated by the pilot. Ordinarily, such regulation of the speed of motor 29 is not required. If the aircraft encounters a very strong head wind it may be necessary to diminish the selected constant speed of motor 29. This adjustment is not critical.

The underside of the fuselage of the aircraft (indicated by the dashed line 28 of Figure 1) is provided with a receiving antenna or dipole 24, which picks up the reflected electromagnetic energy. Said receiving antenna is connected by a coaxial cable 23 to the receiver.

Fig. 3 shows the dipole 24 connected by cable 23 to the converter and intermediate-frequency-amplifier 21.

The reflected beam is rectified in the receiver in the wellknown manner so as to suppress the carrier frequency of the reflected electro-magnetic energy. Such type of rectification is sometimes designated as de-modulation. The output end of said means 21 is connected to an audio-amplifier 22. Said audio-amplifier receives and amplifies only the energy of modulation (if any) of the reflected beam, without receiving or amplifying any part of the energy of the carrier wave of the reflected beam per se. The modulation (if any) of the carrier wave of the reflected beam, is in the audio range, in this example.

The amplified modulation, if any, of the reflected beam, free from the carrier wave, is supplied to the deflecting plates 12 and 13 of the cathode-ray tube 30 through the wires 33 and 33a. Said deflecting plates 12 and 13 control the vertical or up-and-down deflection of the electron ray or stream of the cathode-ray tube 30. Fig. 3 shows the conventional electron gun 32 of said cathode-ray tube 30 and the conventional accelerating anode 110 of said cathode-ray tube 30. The usual high positive voltage is applied to anode 110. The representation of the vertical deflecting plates 10 and 11, which control the horizontal deflection of the electron stream of cathode-ray tube 30, is omitted from Fig. 3. The sidewise deflection plates 10 and 11 are located between the up-and-down deflection plates 12 and 13 and the fluorescent screen 30a of the cathode-ray tube 30, in the usual manner.

Figs. 4a and 4b show an end view of the screen 30a of the cathode-ray tube 30. The fluorescent material of said screen glows when such material is struck by the thin stream of electrons, at the point of impact. Said screen has a horizontal scale 50, which may be calibrated in units of speed per interval of time, or to the angle of deflection of the horn from a predetermined position thereof relative to potentiometer 8. When no potential difference is impressed upon the up-and-down deflecting plates 12 and 13, the electron beam sweeps horizontally across and in contact with the horizontal straight line of scale 50, in exact synchronism with horn 1, while the tip of wiper 7 contacts with the resistor 8.

As shown in Fig. 4a, when modulated energy of the reflected beam is impressed upon the up-and-down deflection plates 12 and 13, the path of the electron beam is elevated above the scale 50 and said path is an irregular line 53, of variable vertical spacing from the horizontal straight line of scale 50. The elevation of each point of the line 53 from the horizontal straight line of scale 50, depends upon the amount of the transient modulated energy as amplified by amplifier 22. When the transient modulated energy of the reflected beam is a minimum but not zero, a corresponding indicating point 51 of line 53 will be closest to scale 50. When the transient modulated energy is zero, said lowest point of line 53, as indicated by point 52 in Fig. 4b, coincides with a point of the straight horizontal line of scale 50. Since the line 53 is traced slowly, the low point 51 or 52 can be easily seen.

As previously stated, in order to depress the low indicating point so that it touches the horizontal straight line of scale 50, as indicated by point 52 in Fig. 4b, it is necessary that the transmitter shall move relative to the aircraft, in a vertical plane which is parallel to or which coincides with the course of the aircraft.

As shown in Fig. 5, the projector together with the other units of the oscillatory drive of Figure 1 is mounted on a turntable 40, which can be turned around a vertical axis. Thus when the selected path of movement of the transmitter is adjusted in order to regulate the angle between said selected path and the axis of the aircraft, the potentiometer 8 and the motor and the driving mechanism, all of which are mounted on turntable 40, are simultaneously shifted so that the tip of wiper 7 always moves along the line of potentiometer 8 and segment 8c. This makes it possible to control the line or plane of movement of the horn 1. Said horn 1 can thus be moved in a vertical plane which is parallel to or which includes the longitudinal axis of the aircraft, or said horn 1 can be moved in a vertical plane which is inclined to the vertical plane of said longitudinal axis.

In practice, there is a maximum angle of 45° between the vertical plane in which the horn 1 is oscillated, and the vertical plane in which the longitudinal axis of the aircraft is located. Hence the generator 6 may be fixed to the aircraft, because the cable 5 is sufficiently flexible to permit the adjustment of turntable 40 through an angle of 45°, on each side of a median position. The pilot therefore adjusts the turntable 40 by any conventional means, until the vertical distance of the lowest point of line 53 from the line of scale 51, is zero. Fig. 5 diagrammatically shows a belt 42 which connects turntable 42 to pulley 41. A pointer 43 is fixed to pulley 41. A scale 43a, calibrated to angles of deflection, is associated with pointer 43. From the above it will be clear that the statement that the movement of the horn 1 recurrently shifts the area of contact in a direction opposite to the course of the aircraft is not to be taken as a limitation but that rather the shift does not need to be one which makes an angle of 180° with the air course since the modulation need not be reduced to zero in order to give sharply defined periods of minimum modulation which are sufficient for practical purposes.

If the lowest indicating point 51 does not touch the line of scale 50, the pilot adjusts the turntable 40, until he secures a contacting point 52 which touches the line of scale 50. The angle through which the turntable 40 must be adjusted, in order to secure a contacting point 52, enables the pilot to determine the lateral speed or drift speed of the aircraft. For example, Fig. 6 shows a vector D, which indicates the course of the aircraft in a forward direction parallel to its longitudinal axis, as indicated by arrow A of Fig. 1. If the contacting indicating point 52 is secured when the pointer 43 is aligned with the zero point of scale 43a, this shows that there is no side drift. If such contacting indicating point 52 is secured when the pointer 43 is off the zero point of scale 43, the respective speed of the aircraft, as shown on scale 50, is plotted as a vector B, whose angle BED with the vector D is equal to the angle of deflection which is indicated on scale 43a. The vector B is then analyzed into a lateral component C and a forward component along line D.

In order to determine the ground speed, it is necessary to know the altitude of the aircraft over the reflecting surface of the earth, because the linear speed of the area of contact between the radiated beam and the surface of the earth, varies in accordance with the distance from the point of origin of such radiated beam, when it is oscillated about such point of origin.

The scale 50 may be calibrated so as to indicate the angle of the radiator horn 1, at the point of zero modulation, while the horn 1 is moving reversely to the direction of forward movement of the aircraft. The scale 50 is also calibrated to a selected constant speed of motor 29, and to a selected altitude. Since the transient altitude of the aircraft is known by using a suitable altimeter, or the apparatus itself may be used as an altimeter (by determining the period in which the beam is transmitted and then reflected at the instant horn 1 is in its vertical position), the actual ground speed of the aircraft can be safely calculated. For example, if the transient altitude is twice the selected altitude to which scale 50 is calibrated for the respective constant speed of motor 29, the ground speed of the aircraft is twice the speed indicated on scale 50 in miles per hour. If the scale 50 is calibrated to the respective transient angles of the horn 1, the ground speed is easily calculated from the tangent of said angle and the transient altitude of the aircraft.

In either embodiment disclosed herein, the transmitted and incident electromagnetic beam, instead of being continuous, can consist of very short pulses of equal duration, separated by equal periods of non-transmission which are equal to the periods of transmission.

The connection between plates 10 and 11 and the battery or other source 9, can be substantially free from induction, which should be a minimum.

As previously stated, there can be no zero modulation while the mouth of the horn 1 is being moved forwardly, because the resultant ground speed of the transient area of contact is then added to the ground speed of the aircraft.

In the embodiment of Fig. 2, a battery 9a, or other source of unidirectional and constant current, has one of its terminals connected to wiper 7. The other terminal of battery 9a is connected to end 8b of potentiometer 8, through an adjustable resistance 79 and through the coil (not shown) of the armature 14 of a conventional galvanometer of the D'Arsonval type. The armature 14 turns around a vertical shaft. This galvanometer has the usual permanent magnet 15. The armature 14 is thus oscillated in synchronism with the oscillation of wiper 7. Said armature 14 is biased by a spring (not shown) so that it has the median position shown in Fig. 2, when the horn 1 is in its median position of Fig. 1.

Said armature has a planar mirror 16, which reflects light from the glow-lamp 17, to the scale-carrier 20.

The glow-lamp 17 is connected to the terminals of a battery or other current-source 25, by means of a circuit which includes a grid-controlled tube 26. Said tube 26 may be of the high vacuum type.

When light is emitted by glow-lamp 17, said light is reflected by mirror 18 through a lens 19, in the form of a narrow beam of parallel rays. Said beam is reflected by planar mirror 16.

The receiver of Fig. 2 is of the same type as that of Fig. 3.

The glow discharge tube 17 has a gaseous filling of sufficiently high gas density, so as to produce numerous ionizing collisions of electrons with molecules, thus producing many ions, when a suitable voltage is applied to the two electrodes of glow discharge tube 17.

If the current through the glow discharge tube is sufficiently small, there is no appreciable radiation of light. This small current is therefore designated as the dark current. This dark current is usually of the order of a microampere.

When the voltage which is applied to the electrodes of glow tube 17 is increased, its glow or illumination is increased, although not exactly in linear relation to the increase of voltage. A familiar type of such glow-tube 17 has a small breakdown voltage, and its glow or illumination is almost linearly proportional to the current through such tube 17.

The light which is emitted by such a glow-tube 17 can be diminished in intensity at minimum modulation or zero modulation, by suitably designing the audio-frequency amplifier circuit.

The light of tube 17 will be extinguished when the output positive voltage of amplifier 22, as applied to the grid of the control tube 26, becomes insufficient to maintain the firing voltage across the glow tube 17.

Conversely, the output of amplifier 22 can be arranged so as to apply an increasing positive potential upon the grid of control tube 26, as the received modulation energy is diminished, and the voltage of source 25 can be adjusted so that the glow tube 17 will flash over when the received modulated energy is zero, or approximately zero. Conventional circuits for this purpose are well-known and require no illustration. The cathode ray type of indicator is preferred to the type of Fig. 2.

If the transmitted beam consists of separated pulses of electromagnetic energy, so that the reflected beam also consists of separated pulses, I can replace the high-vacuum thermionic tube 26 by a grid-controlled tube of the arc-discharge type, such as a thyratron etc. In such cases, the pulses of electromagnetic energy must be sufficiently separated in order to permit the gaseous filling of the thyratron to deionize, before the next pulse is received. Also, if this be done the pulse frequency should be supersonic so that there is no appreciable heterodyning between this frequency and the audio frequency to be detected. The control of the thyratron is of the same type as the control of the high-vacuum tube 26.

I have described preferred embodiments of my invention, but it is clear that numerous changes and omissions and additions can be made without departing from its scope.

The invention includes numerous subcombinations in the improved method and in the improved apparatus. These subcombinations need not be operative per se.

In one broad aspect of my invention, I transmit an incident beam of electromagnetic energy from the moving aircraft, so that said incident beam impinges upon a transient area of contact at which such incident beam touches the surface of the earth; said beam is reflected from said area; the incident beam is moved relative to the aircraft so as to shift said area along the surface of the earth, independently of any shift of said area which is produced by the movement of the aircraft, in order to modulate the reflected energy and I detect said reflected energy on the aircraft. In this aspect, the invention is not limited to demodulating the reflected energy, or to producing modulation which is absolutely zero at recurrent intervals, to any type of indicating or signalling apparatus, or to many other details stated herein, such as adjusting the angle of the ground movement of the area of contact relative to the axis of the aircraft. The area of contact can be shifted so as to produce intervals of minimum modulation, which may exceed zero modulation, in any manner.

I claim:

1. In the art of determining the ground speed and/or course of a moving aircraft, those steps which consist in transmitting an incident beam of electromagnetic energy at a small angle to the vertical from said moving aircraft to impinge upon a respective transient area of contact at which said beam touches the surface of the earth and at which said incident beam is reflected upwardly from said area, moving said incident beam relative to said moving aircraft in order to shift said area along the surface of the earth independently of any shift of said area which is produced by the movement of the aircraft and to recurrently shift said area in a direction opposed to the direction of movement of the aircraft, thus producing a modulation of the reflected beam which is dependent at least in part on the movement of said incident beam relative to said aircraft, and receiving said modulated reflected beam on said aircraft.

2. For use on an aircraft which has a generator of electromagnetic energy, the sub-combination of a radiator for radiating said generated electromagnetic energy, said radiator being supported on said aircraft and projecting said electromagnetic energy as a transmitted beam at a small angle to the vertical, said radiator being movable relative to said aircraft in order to move said transmitted beam relative to said aircraft, drive mechanism mounted on said aircraft and adapted and operative to move said radiator relative to said aircraft recurrently in a selected path towards the rear end of said aircraft, said transmitted beam impinging upon the surface of the earth to be reflected upwardly in at least a part of said selected path, a receiver mounted on said aircraft and adapted to receive the upwardly reflected electromagnetic energy of said upwardly reflected beam.

3. In the art of determining the ground speed and/or course of a moving aircraft, those steps which consist in transmitting an incident beam of electromagnetic energy at a small angle to the vertical from said moving aircraft to impinge upon a respective transient area of contact at which said beam touches the surface of the earth and at which said beam is reflected upwardly from said area, moving said incident beam relative to said moving aircraft in order to shift said area along the surface of the earth independently of any shift of said area which is produced by the movement of the aircraft, thus producing a modulation of the reflected beam which is dependent at least in part on the speed at which said area is thus shifted by the movement of said incident beam relative to said moving aircraft, said incident beam being thus moved relative to said moving aircraft to shift said area recurrently in a direction which is opposed to the direction of movement of the aircraft and in a path which is sufficiently parallel to the course of the aircraft, to produce a recurrent and sharply defined period of substantially zero modulation of said reflected beam, and receiving said reflected beam on said moving aircraft.

4. For use on an aircraft, which has a generator of electromagnetic energy, the subcombination of a transmitter for transmitting said generated electromagnetic energy, said transmitter being supported on said aircraft, said transmitter transmitting said electromagnetic energy as a transmitted beam, said transmitter being movable relative to said aircraft to move said transmitted beam relative to said aircraft through a small angle to the vertical, drive mechanism mounted on said aircraft and adapted and operative to move said transmitter relative to said aircraft recurrently in a selected path towards the rear end of the aircraft, said drive mechanism being adjustable on said aircraft to adjust the angle of said selected path relative to the course of the aircraft, said transmitted beam impinging upon the surface of the earth to be reflected upwardly in at least a part of said selected path, said drive mechanism moving said transmitter towards the rear end of the aircraft while said electromagnetic energy is thus upwardly reflected, and a receiver mounted on said aircraft and adapted to receive said upwardly reflected electromagnetic energy.

5. In the art of determining the ground speed and/or course of a moving aircraft, those steps which consist in transmitting an incident beam of electromagnetic energy from said aircraft to impinge upon a respective transient area of contact at which said beam touches the surface of the earth and at which said beam is reflected upwardly from said area, moving said incident beam relative to said moving aircraft through a small angle to the vertical in order to shift said area along the surface of the earth independently of said shift of said area which is produced by the movement of the aircraft, thus producing a modulation of the reflected beam which is dependent at least in part at the speed at which said area is thus shifted by the movement of said incident beam relative to said moving aircraft, said incident beam being thus moved relative to said moving aircraft to shift said area recurrently in a selected path in which the direction of movement of said area is opposed to the direction of movement of the aircraft, moving said area thus recurrently to produce recurrent and sharply defined periods of minimum modulation, shifting said path until it is substantially parallel to the course of the airplane, and receiving said reflected beam on said moving aircraft.

6. In the art of determining the course of an aircraft, those steps which consist in transmitting an incident beam of electromagnetic energy at a small angle to the vertical from said moving aircraft to impinge upon a respective transient area of contact at which said beam touches the surface of the earth and at which said beam is reflected upwardly from said area, moving said incident beam relative to said moving aircraft in order to shift said area along the surface of the earth independently of any shift of said area which is produced by the movement of the aircraft and in a direction opposed to the direction of movement of the aircraft, and regulating the angle between the course of the aircraft and the path along which said area is thus shifted by said movement of said incident beam relative to said aircraft.

7. A method of determining the ground speed and/or course of a moving aircraft, which consists in transmitting an incident beam of electromagnetic energy at a small angle to the vertical to impinge upon a transient area of contact at which said beam touches the surface of the earth and at which said incident beam is reflected upwardly from said area, moving said incident beam at an increasing velocity relative to said moving aircraft in order to shift said area recurrently along the surface of the earth in a direction opposed to the direction of movement of said aircraft independently of any shift of said area which is produced by the movement of the aircraft, thus producing a modulation of the reflected beam which is dependent at least in part on the movement of said beam relative to said aircraft, regulating the ground speed of said area and its ground path to produce recurrent sharp variations in said modulation, said variations being dependent upon the relation between the ground speed of said aircraft and the ground speed of said area, receiving said modulated reflected beam on said aircraft, and using said recurrent sharp variations to control a signal device which indicates the ground speed of said aircraft.

8. A method according to claim 7, in which said recurrent sharp variations correspond to respective intervals of substantially zero ground speed of said area.

9. A method of determining the ground speed and/or course of a moving aircraft, which consists in transmitting an incident beam of electromagnetic energy from said moving aircraft to impinge upon a respective transient area of contact at which said beam touches the surface of the earth and at which said beam is reflected upwardly from the said area, moving said incident beam relative to said moving aircraft in order to shift said area along the surface of the earth independently of any shift of said area which is produced by the movement of the aircraft, thus producing a modulation of the reflected beam which is dependent at least in part on the relation between said ground speed of said aircraft and ground speed of said area and the path of movement of said area which are both produced by said movement of said incident beam relative to said aircraft, said area being shifted in a direction opposed to the direction of movement of the aircraft during such modulation, deflecting an electron stream from a predetermined normal undeflected direction in synchronism with said movement of said incident beam relative to said aircraft so that said stream is thus moved in a selected path, receiving said reflected electromagnetic beam on said aircraft, regulating the ground speed and the path of movement of said area which are produced by said relative movement of said incident beam to produce recurrent sharp variations in said modulation, and utilizing the reflected beam which is received on said aircraft to deflect said electron stream from its said selected path.

10. A method according to claim 9, in which said recurrent sharp variations are produced by thus relatively moving said incident beam to secure corresponding intervals in which said area of contact has substantially zero ground speed.

11. For use in combination with an aircraft and a generator of electromagnetic energy, a projector which is adapted to project said electromagnetic energy, said projector being located on said aircraft and being movable relative to said aircraft, mechanism located on said aircraft and adapted and operative to move said projector relative to said aircraft in a respective selected path in which the projected electromagnetic energy impinges upon a transient area of contact at which said projected energy touches the surface of the earth and at which said projected energy is upwardly reflected, a receiver for said reflected energy, said receiver being located on said aircraft, a cathode-ray tube located on said aircraft, first deflection means located on said aircraft and adapted to deflect the beam of electrons of said cathode-ray tube from a normal undeflected direction in synchronism with the movement of said projector relative to said aircraft so that said beam is moved in a respective selected path, second deflection means operative to deflect said beam laterally from its respective selected path, said second deflection means being energized by the received electromagnetic energy, said projector being moved in its selected path by said mechanism to make the ground speed of said area which is produced by said movement of said projector relative to said aircraft, a minimum at recurrent intervals.

12. Apparatus according to claim 11, in which said projector is adjustable on said aircraft to adjust the angle between its respective selected path and the axes of the aircraft.

13. On an aircraft which has a generator of electromagnetic energy, a projector for said energy, said projector being turnably connected to said aircraft along a horizontal axis, driving mechanism adapted to oscillate said projector around said horizontal axis while said projector transmits said energy downwardly, said projector being oscillated at variable speed through a small angle to the vertical the maximum speed being sufficiently great so that the ground speed of the energy transmitted from said projector exceeds the ground speed of the aircraft at recurrent intervals and while said projector is being moved towards the rear of the aircraft, a potentiometer located on said aircraft, a source of fixed and unidirectional potential located on said aircraft and having its terminals connected to the ends of said potentiometer, a wiper which is actuated in synchronism with said projector, said wiper contacting with said potentiometer during the actuation of said wiper, first means responsive to potential-difference, said means being connected respectively to the potentiometer and to the wiper, a receiver mounted on said aircraft to receive said energy after it has been upwardly reflected from the surface of the earth, and additional means connected to said receiver and responsive to the output energy of said receiver.

14. Apparatus according to claim 13, in which a cathode-ray tube is located on said aircraft, said first means being a respective pair of deflection plates of said tube, said additional means being another respective pair of said deflection plates.

15. Apparatus according to claim 13, in which said first responsive means are the coil of a galvanometer, an armature connected to said coil, an electric lamp and a source of electric current for said lamp mounted on said aircraft, said additional means being a grid-controlled tube which is in the circuit of said electric lamp.

LEE DE FOREST.